(12) United States Patent
Oh (10) Patent No.: US 10,684,613 B2
(45) Date of Patent: Jun. 16, 2020

(54) DATA COMMUNICATION METHOD FOR REDUCING WORKING TIME OF AUTOMATED MATERIAL HANDLING SYSTEM

(71) Applicant: Hak Seo Oh, Gyeonggi-do (KR)

(72) Inventor: Hak Seo Oh, Gyeonggi-do (KR)

(73) Assignee: CANTOPS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/915,869

(22) Filed: Mar. 8, 2018

(65) Prior Publication Data

US 2019/0196456 A1    Jun. 27, 2019

(30) Foreign Application Priority Data

Dec. 27, 2017 (KR) ........................ 10-2017-0181176

(51) Int. Cl.
*G05B 19/418* (2006.01)
*H04W 88/18* (2009.01)

(52) U.S. Cl.
CPC ..... *G05B 19/4186* (2013.01); *G05B 19/4189* (2013.01); *G05B 2219/31376* (2013.01); *G05B 2219/33192* (2013.01); *G05B 2219/36454* (2013.01); *H04W 88/18* (2013.01)

(58) Field of Classification Search
None
See application file for complete search history.

(56) References Cited

U.S. PATENT DOCUMENTS

| 2008/0213073 | A1* | 9/2008 | Benedict | B65G 63/004 414/279 |
| 2011/0172875 | A1* | 7/2011 | Gibbs | B65G 67/20 701/31.4 |
| 2011/0313740 | A1* | 12/2011 | Ikeda | G05B 17/02 703/2 |
| 2015/0269107 | A1* | 9/2015 | Tanimoto | H01L 21/67733 710/105 |
| 2015/0316924 | A1* | 11/2015 | Oh | G05B 19/41865 700/99 |
| 2017/0255182 | A1* | 9/2017 | Shizuku | B29D 30/0016 |

FOREIGN PATENT DOCUMENTS

| KR | 101527686 | 6/2015 |
| KR | 101616706 | 5/2016 |

* cited by examiner

*Primary Examiner* — Ziaul Karim
(74) *Attorney, Agent, or Firm* — IPLA P.A.; James E. Bame (57) ABSTRACT

A data communication method for reducing a working time of an automated material handling system between a master communication device installed in an unmanned transfer device and a slave communication device installed in a manufacturing facility in the automated material handling system which transfers a carrier between manufacturing facilities through the unmanned transfer device where the method is to reduce a working time for a carrier by transmitting and receiving data to and from a manufacturing facility while an unmanned transfer device is stopped before performing a carrier work or while it is moving after performing a carrier work, when the unmanned transfer device and the manufacturing facility transmit and receive data for transferring the carrier by using a wireless data communicating device in an automated material handling system.

8 Claims, 9 Drawing Sheets

DATA COMMUNICATION METHOD FOR REDUCING WORKING TIME OF AUTOMATED MATERIAL HANDLING SYSTEM

CROSS REFERENCE

The present application claims priority to Korean Patent Application No. 10-2017-0181176, filed 27 Dec. 2017, the entire contents of which is incorporated herein for all purposes by this reference.

BACKGROUND

The present invention relates to technology to reduce a working time for a carrier by transmitting and receiving data to and from a manufacturing facility while an unmanned transfer device is stopped before performing a carrier work or while it is moving after performing a carrier work, when the unmanned transfer device and the manufacturing facility transmit and receive data for transferring the carrier by using a wireless data communicating device in an automated material handling system.

Generally, in manufacturing processes of a liquid crystal display device and a semiconductor element, the manufacturing goods are transferred to the manufacturing equipment of each manufacturing process by using an automated material handling system (AMHS), so that the corresponding goods are manufactured according to the manufacturing processes of each manufacturing equipment. Such an automated material handling system utilizes an unmanned transporting device for transferring a carrier of receiving a semiconductor substrate or a liquid crystal substrate to the manufacturing station located on the manufacturing process line and transferring the carrier of again receiving the goods completely processed in the corresponding manufacturing equipment to the next manufacturing equipment.

Depending on the movement method thereof, the unmanned transporting device includes an automated guided vehicle (AGV) for driving through the wheel, a rail guided vehicle (RGV) for driving along the guide rail located at the bottom, and an overhead hoist transport (OHT) for driving a guide rail installed in the ceiling. These unmanned transporting devices are moved to the corresponding manufacturing equipment by using the wheel itself or along the bottom rail or the overhead rail and it carries the carrier onto or carries the carrier out the manufacturing equipment by using an operating arm or a hoist and a hand.

The carrying/carrying out of the carriers is accomplished by the host computers mounted on the unmanned transporting device and the manufacturing equipment under the control of the main controller for controlling the entire manufacturing lines. At this time, since it requires the interlock operation between the unmanned transporting device and the manufacturing equipment during the carrying/carrying out of the carrier, transmission devices of an optical communication mode using an IR (Infrared) are installed on the unmanned transporting device and the manufacturing equipment respectively so as to send and receive the necessary data, thereby smoothly performing the carrying/carrying out of the carriers.

Figure 1:
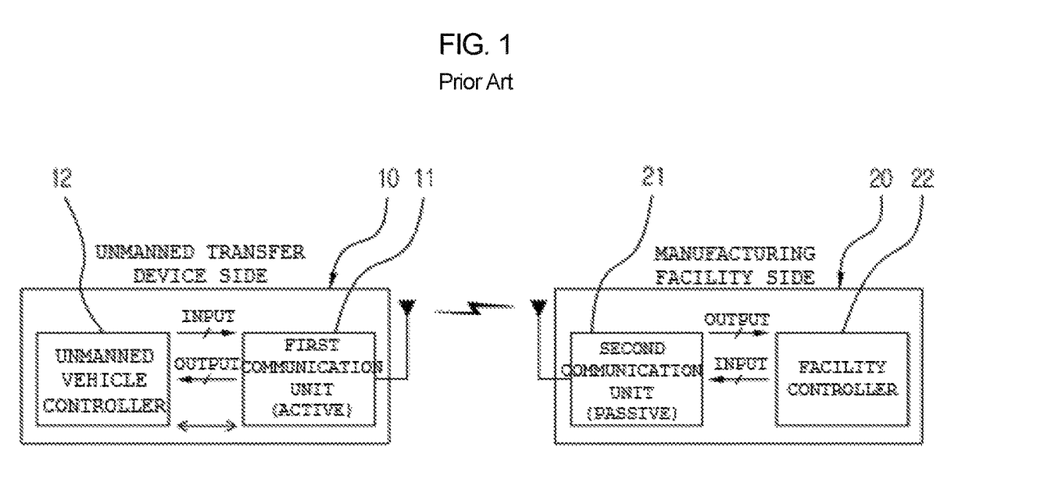
FIG. 1 is a block diagram illustrating a communication system for automated material handling system using a conventional optical communication.
Figure 2:
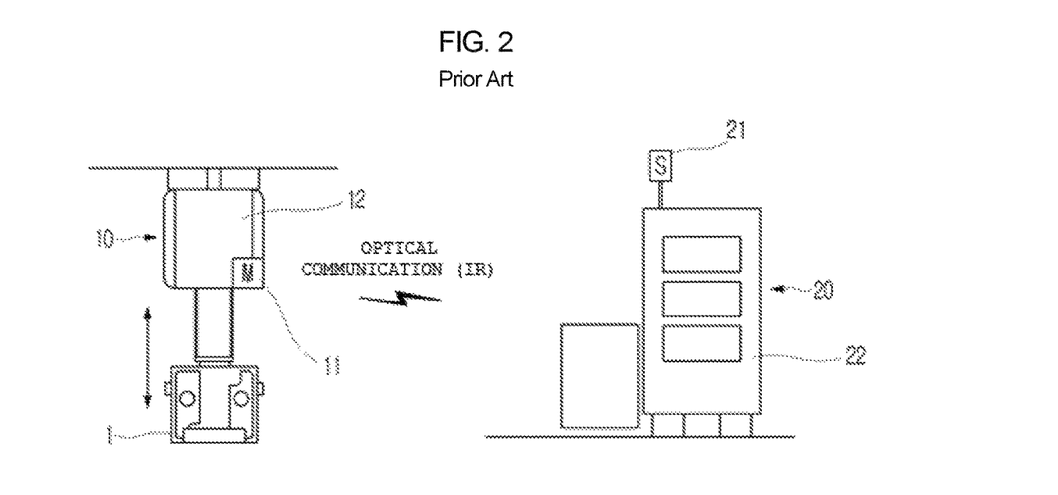
FIG. 2 is a diagram illustrating a communication process between a manufacturing equipment and an unmanned transporting device of FIG. 1.
Figure 3:
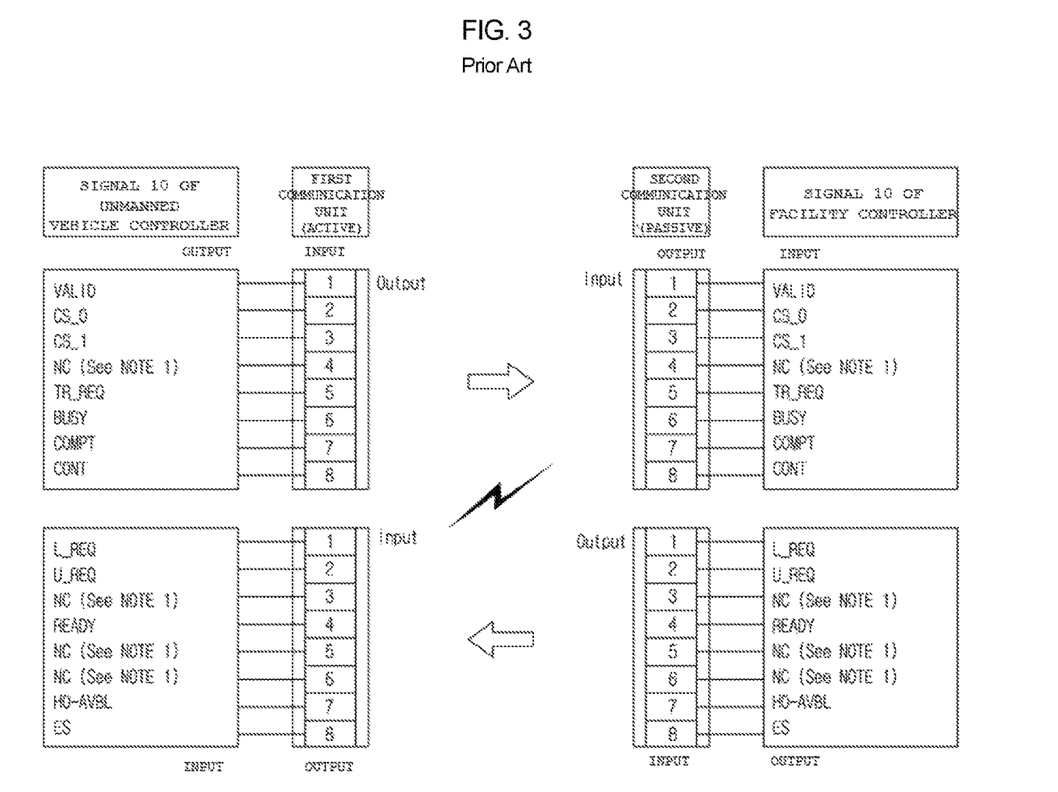
FIG. 3 is a diagram illustrating a signal configuration of E84 applied to FIG. 1.
Figure 4:
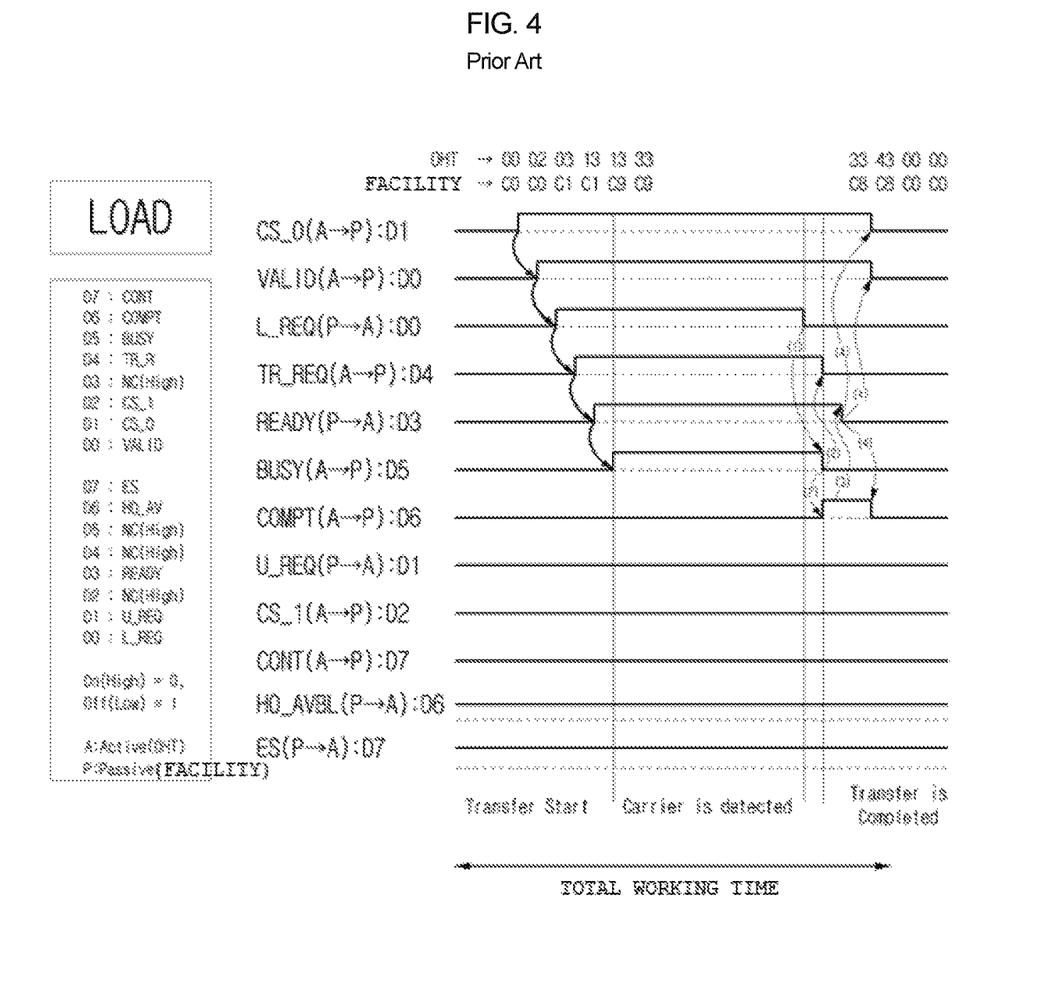
FIG. 4 is a diagram illustrating a handoff procedure of E84 necessary to a loading.
Figure 5:
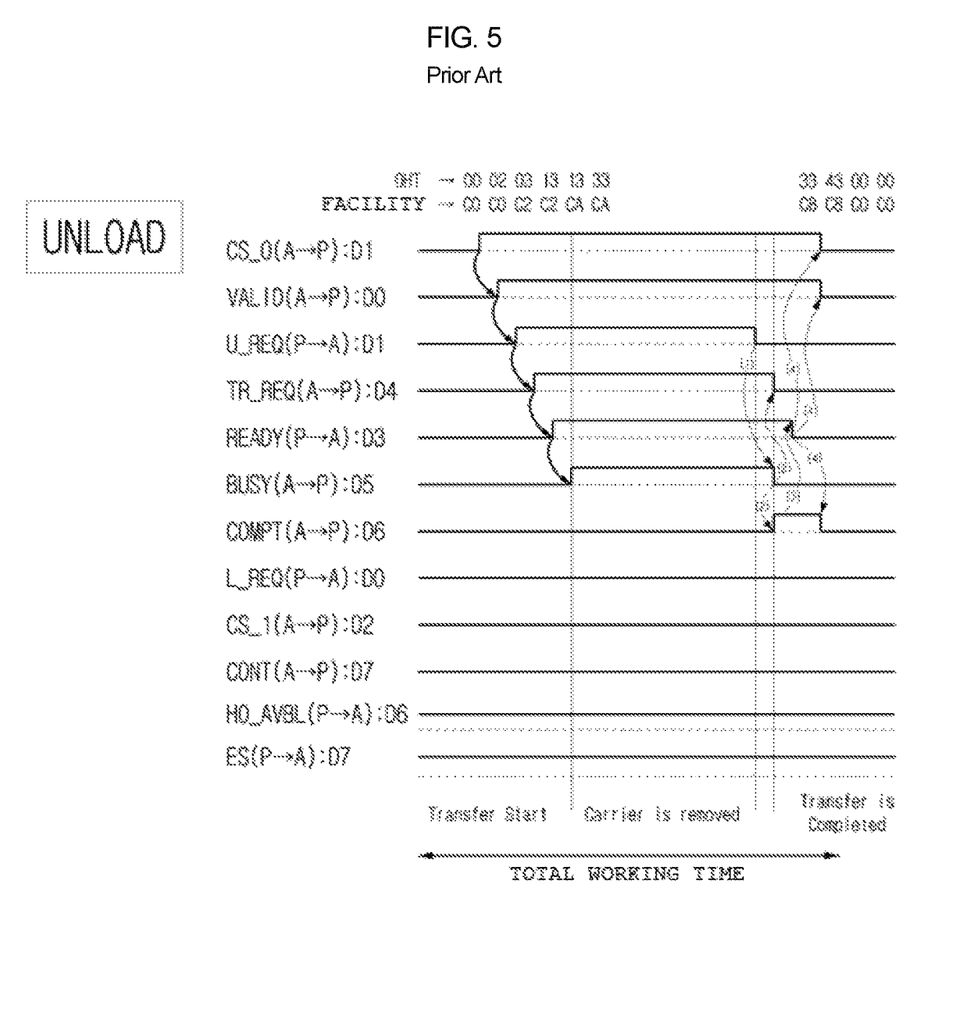
FIG. 5 is a diagram illustrating a handoff procedure of E84 necessary to an unloading.

FIG. 1 is a block diagram illustrating a communication system for automated material handling system using a conventional optical communication, FIG. 2 is a diagram illustrating a communication process between a manufacturing equipment and an unmanned transporting device of FIG. 1, FIG. 3 is a diagram illustrating a signal configuration of E84 applied to FIG. 1, FIG. 4 is a diagram illustrating a handoff procedure of E84 necessary to a loading, and FIG. 5 is a diagram illustrating a handoff procedure of E84 necessary to an unloading.

Referring to FIG. 1 and FIG. 2, the unmanned transporting device (10) includes an automated vehicle controller (12) and a first communication unit (11) and the manufacturing equipment (20) includes an equipment controller (22) and a second communication unit (21). At this time, the automated vehicle controller (12) sends and receives the carrier by using a SEMI E84, which is a protocol used in the handoff, or a method similar to it through the first communication unit (11) of the unmanned transporting device (10) and the second communication unit (21) of the manufacturing equipment (20).

That is, when it sends and receives the material (1) between the unmanned transporting device (10) and the manufacturing equipment (20), the first communication unit (11) and the second communication unit (21) send and receive the input and output signals each other according to the operation sequence of the E84, so that the materials are loaded or unloaded.

As shown in FIG. 3, the first communication unit (11) and the second communication unit (21) transmit and receive eight input signals and eight output signals according to the operation sequence of the E84. Also, the first communication unit (11) and the second communication unit (21) perform a handoff function on a load port that is, the loading working and the unloading working through the process shown in FIG. 4 and FIG. 5.

At this time, in order to perform the optical communication between the first communication unit (11) and the second communication unit (21), the optical axis should be collinearly. Accordingly, the loading working or the unloading working shown in FIG. 4 or FIG. 5 should be conducted in a state that the unmanned transporting device (10) stops at the corresponding working position of the manufacturing equipment (20).

For example, in a case that the total time on the loading working or the unloading working takes about 10 seconds, the automated material handling system is operated while the unmanned transporting device (10) stops at the corresponding working position of the manufacturing equipment (20) for at least 10 seconds.

That is, there is a limit to the improvement of the overall operation efficiency of the automated material handling system owing to the stoppage time spent on the work performance of the unmanned transporting device.

In other words, in order to operate the automated material handling system more efficiently, it is necessary to minimize the stoppage time of the unmanned transporting device.

SUMMARY OF THE INVENTION

The present invention has been made in consideration of the circumstances described above, and is to provide a data communication method for reducing a working time of an automated material handling system, in which an unmanned transfer device performs data communication with a manufacturing facility for setting work environment and releasing work environment while moving, to reduce a stopping time of the unmanned transfer device on the manufacturing facility side.

In addition, as another technical object, the present invention is to provide a data communication method for reducing a working time of an automated material handling system, in which an unmanned transfer device and a manufacturing facility perform data communication at a wireless communication start time point considering a moving speed of the unmanned transfer device and a time necessary for setting work environment, to minimize communication noise for the other unmanned transfer device therearound to secure stable work performance.

According to an aspect of the invention to achieve the object described above, there is provided a data communication method for reducing a working time of an automated material handling system between a master communication device installed in an unmanned transfer device and a slave communication device installed in a manufacturing facility in the automated material handling system which transfers a carrier between manufacturing facilities through the unmanned transfer device, the method including: a first step in which the master communication device and the slave communication device perform RF communication for setting work environment until the unmanned transfer device moves and stops at a work position of a manufacturing facility; a second step in which the master communication device and the slave communication device convert work control information based on loading and unloading work for a carrier into RF data, and transmit and receive the data to and from each other, in the state where the unmanned transfer device stops at the work position of the manufacturing facility; and a third step in which the unmanned transfer device starts moving along a rail when the loading and unloading work is completed in the manufacturing facility, and the master communication device and the slave communication device perform RF communication for releasing work environment.

Preferably, the first step is performed in a deceleration section where the unmanned transfer device decelerates to stop at the work position of the manufacturing facility after the unmanned transfer device moves at a predetermined speed.

Preferably, in the first step, the unmanned transfer device is configured to include a step of calculating a deceleration section on the basis of a stop position and a deceleration speed, a step of controlling the deceleration speed of the unmanned transfer device such that an RF communication time for setting work environment is included in the deceleration section, a step of setting a position preceding as much as a distance corresponding to the RF communication time for setting work environment at the stop position of the unmanned transfer device, as a wireless communication start time point, and a step of performing RF communication for setting work environment at the wireless communication start time point.

Preferably, an identification means for providing wireless communication start position information around the moving path of the unmanned transfer device, and wherein in the first step, the unmanned transfer device recognizes a wireless communication start position on the basis of acquisition of the identification information from the identification means through an identification information recognition means, and provides the wireless communication start position to the master communication device, thereby performing RF communication for setting work environment between the master communication device and the slave communication device.

Preferably, in the first step, the unmanned transfer device is configured to include a step of RF-initializing the master communication device by using a facility ID and a channel of the manufacturing facility, and wherein the unmanned transfer device determines a wireless communication start position to perform RF communication for setting RF initialization for the master communication device and for setting work environment between the master communication device and the slave communication device until the unmanned transfer device stops at the work position of the manufacturing facility.

Preferably, the unmanned transfer device is controlled to move such that only one unmanned transfer device is positioned in a moving section from the wireless communication start position to the stop position.

Preferably, the master communication device of the unmanned transfer device is configured to further include a step of performing RF communication for setting work environment of the first step with the slave communication device, and then comparing the current position thereof with the stop position, and a step of recognizing that the other unmanned transfer device is working when the unmanned transfer device does not reach the stop position within a predetermined time, switching the master communication device to a standby state, and clearing the currently set work environment setting information.

Preferably, the unmanned transfer device is configured to further include a step of performing the operation of the first step when the work for the other unmanned transfer device is completed for the manufacturing facility in the state where the master communication device is switched to the standby state.

BRIEF DESCRIPTION OF THE DRAWINGS

The above and other objects, features and advantages of the present invention will be more apparent from the following detailed description taken in conconfluence with the accompanying drawings, in which.

DETAILED DESCRIPTION OF THE PREFERRED EMBODIMENT

Hereinafter, a preferred embodiment according to the present invention will be described in detail with reference to the accompanying drawings. Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them. This invention can be implemented in many different forms without departing from technical aspects or main features.

Figure 6:
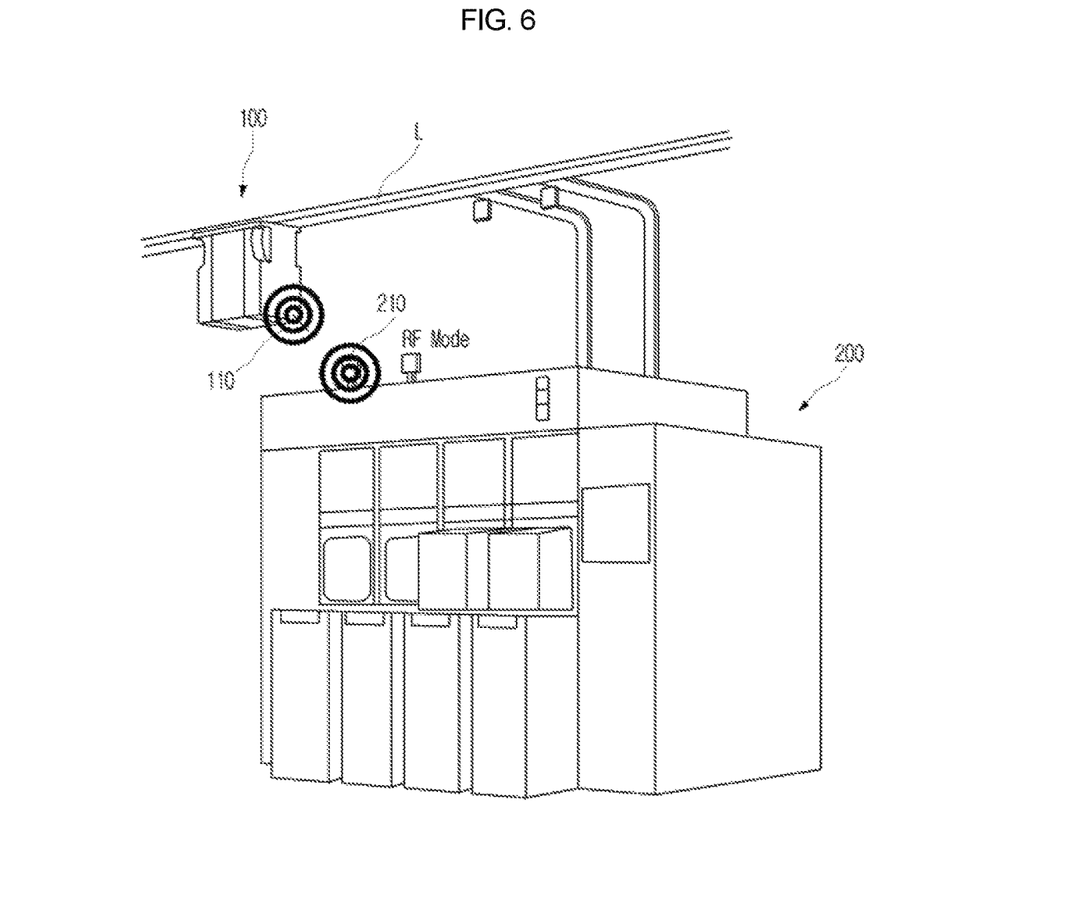
FIG. 6 is a diagram for explaining a process of performing communication between an unmanned transfer device and a manufacturing facility in an automated material handling system.
Figure 7:
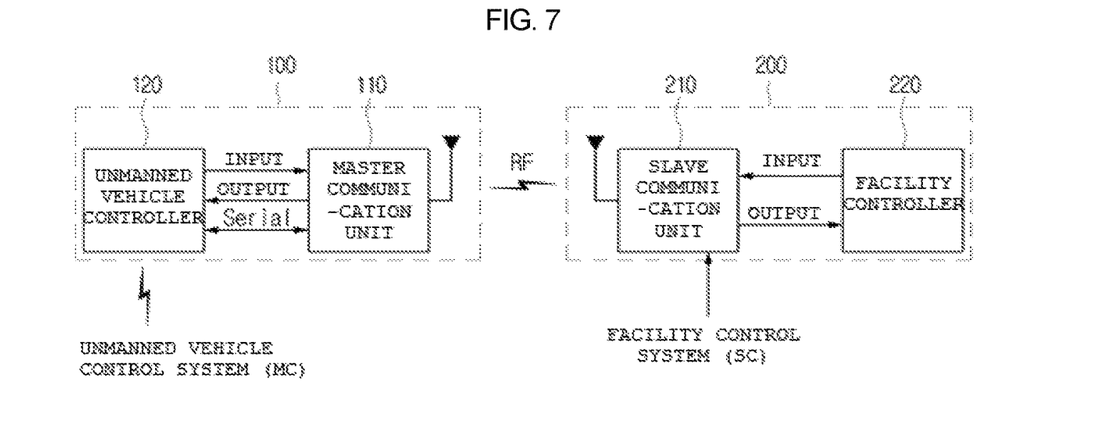
FIG. 7 is a block diagram schematically illustrating configurations of principal units of a communication system of the automated material handling system.

FIG. 6 and FIG. 7 are diagrams for explaining a configuration of an automated material handling system according to the present invention. FIG. 6 is a diagram for explaining a process of performing communication between an unmanned transfer device and a manufacturing facility in an automated material handling system, and FIG. 7 is a block diagram schematically illustrating configurations of principal units of a communication system of the automated material handling system.

Referring to FIG. 6 and FIG. 7, the automated material handling system according to the present invention includes an unmanned transfer device (100) which moves along a rail (L), and a manufacturing facility (200) which performs a process work for a carrier, and the unmanned transfer device (100) and the manufacturing facility (200) perform RF communication with each other.

The unmanned transfer device (100) includes a master communication unit (110) which performs RF communication with the manufacturing facility (200), and an unmanned vehicle controller (120) which performs an overall control operation for the unmanned transfer device (100). In this case, the master communication unit (110) transmits and receives parallel data for E84 input/output signal control to and from the unmanned vehicle controller (120), performs setting of the master communication unit (110) by an upper-level unmanned vehicle control system (MC), and performs serial communication for additional information transmission and reception data.

The manufacturing facility (200) includes a slave communication unit (210) which performs RF communication with the unmanned transfer device (100), and a facility controller (220) which performs an overall control operation for the manufacturing facility (200). In this case, the slave communication unit (210) transmits and receives parallel data for E84 input/output signal control to and from the facility controller (220), is connected to an upper-level facility control system (SC) to perform setting of the slave communication unit (210) and serial communication when reading additional information and the like.

The master communication unit (110) and the slave communication unit (210) transmit and receive data by RF communication by using an E84 protocol which is a carrier handoff parallel input/output interface.

Figure 8:
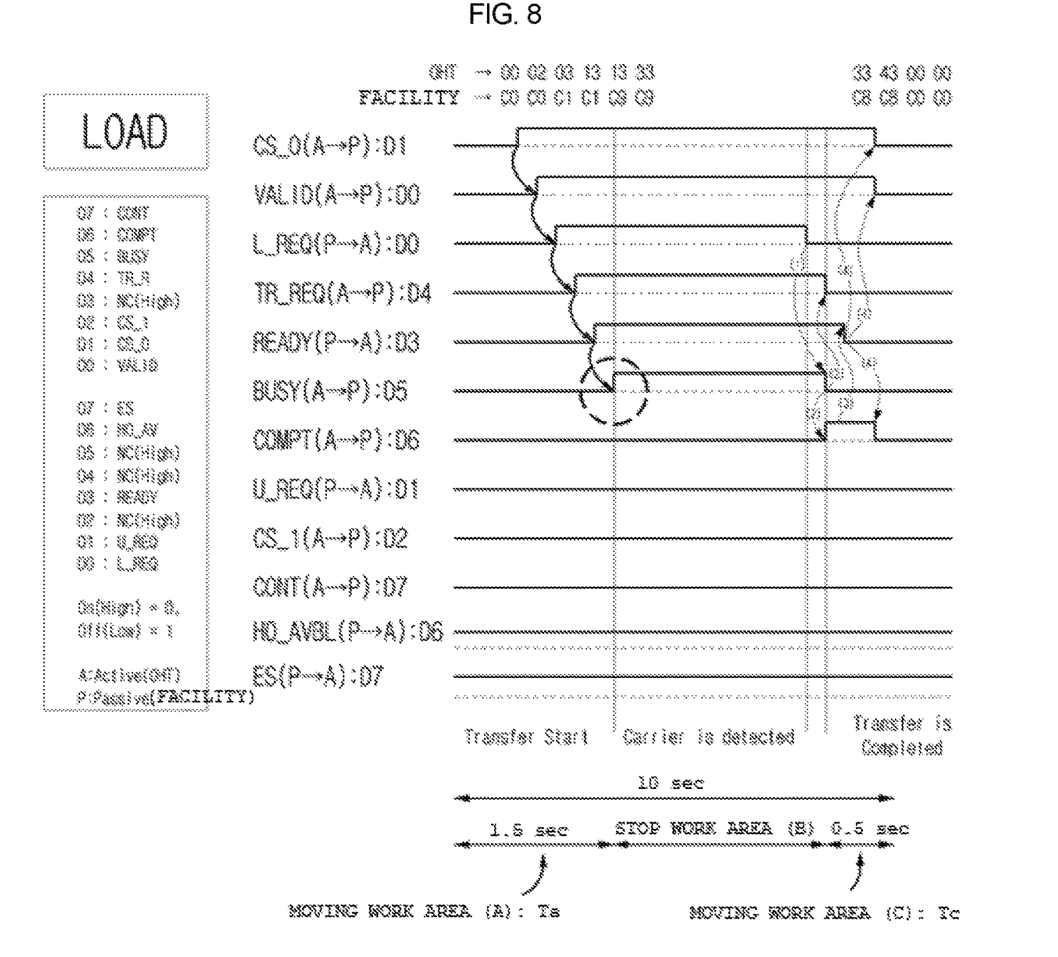
FIG. 8 illustrates an E84 handoff process necessary for loading by way of example so as to divide a work area according to movement of the unmanned transfer device.

In the present invention, as illustrated in FIG. 8, a work area of the unmanned transfer device (100) is defined by division into a moving work area in which the unmanned transfer device (100) can work while moving along the rail (L), and a stop work area in which the unmanned transfer device (100) can work in a state of stopping at the position of the manufacturing facility (200).

In FIG. 8, the stop work area (B) is an area where the unmanned transfer device (100) and the manufacturing facility (200) perform work of loading or unloading a carrier by physical interlocking, and the moving work area may be a work environment setting area (A) and a work environment release area (C) consisting of only data communication before and after the stop work area (B).

FIG. 8 illustrates an E84 handoff process necessary for loading by way of example, and a work environment setting operation, a stop work, and a work environment release operation will be described on the basis thereof. The E84 handoff process for unloading is the same as the E84 handoff process for loading, and detailed description thereof is not described.

In FIG. 8, the unmanned transfer device (100) is operated by an active device, a load port of the manufacturing facility (200) is operated by a passive device, signal control of E84 is performed in the active device, and the passive device gives and takes a carrier in a form of responding in accordance with signal control of the active device. In this case, P→A denotes a signal of transmission from the passive device to the active device, and A→P denotes a signal of transmission from the active device to the passive device.

The unmanned controller (120) designates a position of a load port for transmission, and turns on a VALID signal, and the facility controller (220) selectively turns on unload (U_REQ) when there is a carrier and turns on load (L_REQ) when there is no signal.

The unmanned vehicle controller (120) turns on TR_REQ reporting the start of transfer only when L_REQ is on while currently having a carrier and when U_REQ is on while currently having no carrier.

In other cases, the unmanned vehicle controller (120) stops handoff when receiving a U_REQ signal while currently having a carrier or when receiving an L_REQ signal while currently having no carrier.

When the TR_REQ signal of the unmanned vehicle controller (120) is turned on, the load port turns on READY. When READY is turned, BUSY is turned on in the sense of the actual progress of handling, thereby performing transfer work of loading or unloading.

In other words, in FIG. 8, a time from the RF communication start time point to turning on BUSY is defined as a work environment setting time (Ta), and the time point after BUSY is turned on is defined as a stop work start time point of loading or unloading a carrier to and from the manufacturing facility (200).

Thereafter, the load port turns off L_REQ in case of changing from No Carrier to Carrier, and turns off U_REQ in case of changing from Carrier to No Carrier.

The unmanned vehicle controller (120) turns off a BUSY signal when the transfer work is completed or turns off a TR_REQ signal when the load port turns off an L_REQ or U_REQ signal, and turns on a COMPT signal which means completion of work. Since the transfer work is completed when COMPT is turned on, the load port turns off READY, and the unmanned transfer device (100) turns off signals of COMPT, CS_0, and CS_1 when READY is turned off.

In other words, as the transfer work of the unmanned transfer device (100) is completed, the unmanned vehicle controller (120) turns off a BUSY signal, and a COMPT signal is turned on thereby. An area up to the time point when a COMPT signal is turned on is defined as a stop work area (B), and the subsequent area is defined as a work environment release area (C) where the unmanned transfer device (100) can work while moving along the rail (L). In this case, a work environment release time (Tc) may be set to a time after the time point when COMPT is turned off, preferably, to the time point when COMPT is turned off.

As described above, according to the present invention, the unmanned transfer device (100) stops at the manufacturing facility (200), and performs data communication work related to work environment substantially other than the time of performing loading and unloading work through loading and unlading while moving along the rail (L_, thereby minimizing a stopping time for the unmanned transfer device (100).

For example, when the total working time of the unmanned transfer device (100) is 10 seconds and the time necessary for the stop work area (B) thereof is 8 seconds, 1.5 seconds of the time (Ta) necessary for previous work environment setting and 0.5 seconds of the time (Tc) necessary for work environment release thereafter are achieved while the unmanned transfer device (100) moves along the rail (L). Accordingly, it is possible to shorten the time when the unmanned transfer device (100) stops to perform work by about 20%.

Meanwhile, generally, as illustrated in FIG. 6, in the automated material handling system, a plurality of unmanned transfer devices (100) are positioned to be adjacent to one manufacturing facility (200) to perform each process work.

Figure 9:
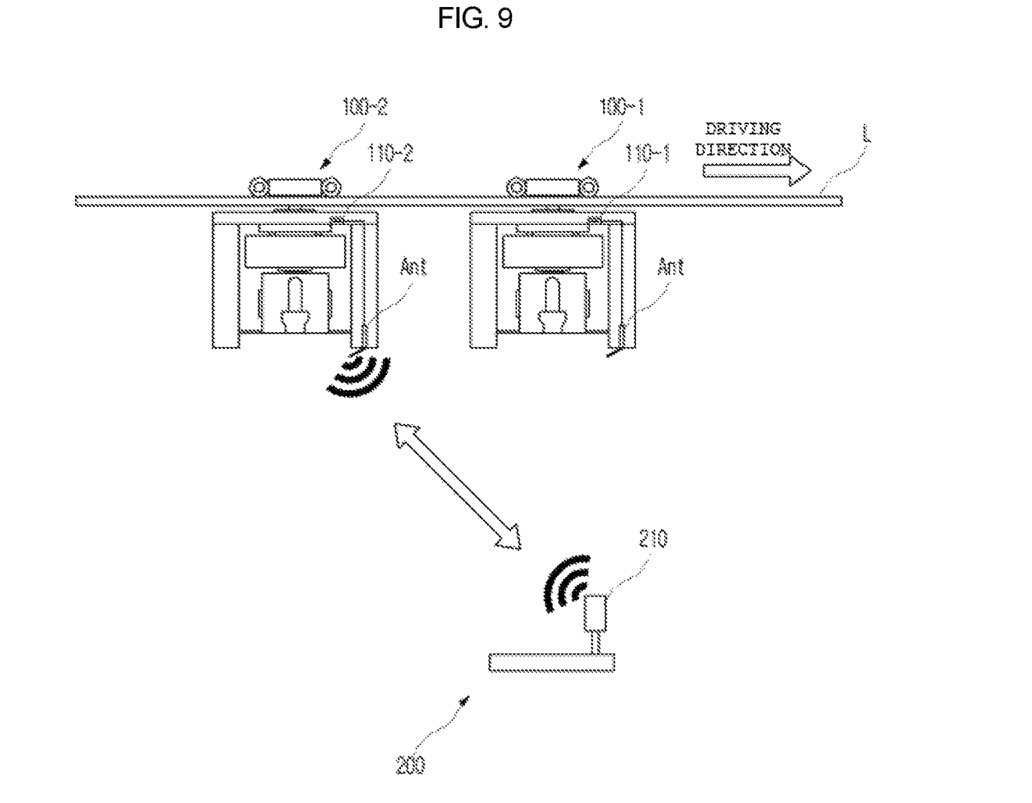
FIG. 9 illustrates an example of a situation in which first and second unmanned transfer devices (100-1 and 100-2) are positioned to be adjacent and are moving on the rail (L)

Accordingly, as illustrated in FIG. 9, on the rail (L), a situation in which the plurality of unmanned transfer devices (100) are moving may occur. FIG. 9 illustrates an example of a situation in which first and second unmanned transfer devices (100-1 and 100-2) are positioned to be adjacent and are moving on the rail (L).

In this case, the slave communication unit (210) positioned on the manufacturing facility (200) side first starts communication with the first unmanned transfer device (100-1), and the first unmanned transfer device (100-1) completes work and then moves in a driving direction through the rail (L). Then, the slave communication unit (210) has to perform work by communicating with the second unmanned transfer device (100-2).

However, in the situation illustrated in FIG. 9, though the first unmanned transfer device (100-1) first arrives at the manufacturing facility (200), the second unmanned transfer device (100-2) is also positioned in a communication radius of the slave communication unit (210), and thus the slave communication unit (210) can first start communication with the second unmanned transfer device (100-2).

In this case, since the second unmanned transfer device (100-2) cannot move to the position of the manufacturing facility (200) to work due to the first unmanned transfer device (100-1), the second unmanned transfer device (100-2) performs work and wireless communication up to predetermined sequence and finally causes an error in a state where the work is not performed. Due to such an obstacle, as a result, a problem that the total working time is increased may occur.

In consideration of such a circumstance, in the present invention, the wireless communication start position of the unmanned transfer device (100) is clearly set up.

In this case, the unmanned transfer device (100) calculates a deceleration section from the position of starting deceleration for stopping at the position of the manufacturing facility (200) to the stop position, and may adjust the deceleration speed of the unmanned transfer device (100) to achieve data communication for setting work environment in the deceleration section. This is for the master communication unit (110) and the slave communication unit (210) to more stably communicate by performing wireless communication for setting work environment in a low-speed moving section.

In other words, the unmanned transfer device (100) sets the deceleration position at which the work environment setting operation is completed before the stop work in the deceleration section, as the wireless communication start position.

Figure 10:
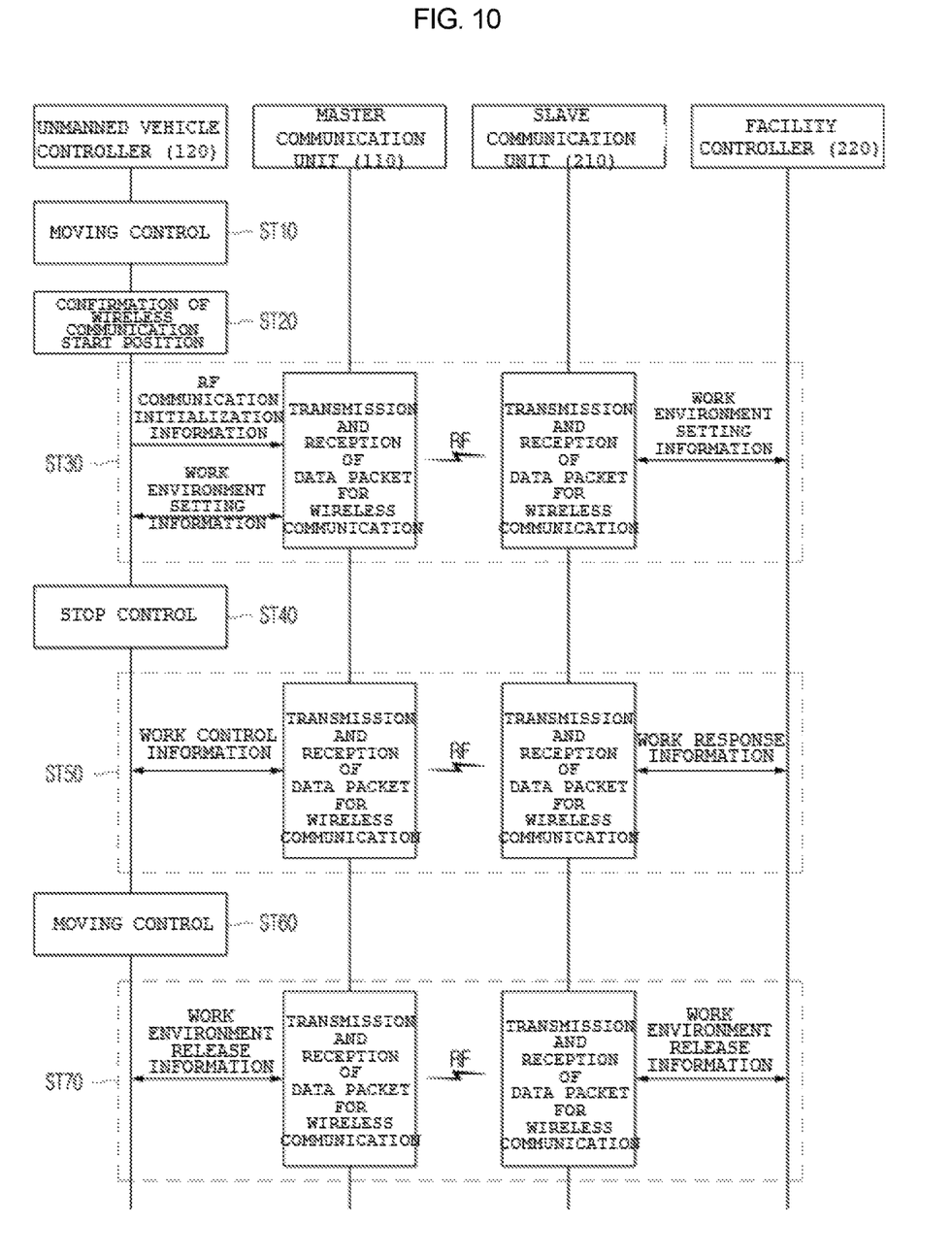
FIG. 10 is a diagram illustrating a data transmission method for reducing a working time of an automated material handling system according to an embodiment of the present invention.

FIG. 10 is a diagram illustrating a data transmission method for reducing a working time of an automated material handling system according to an embodiment of the present invention.

Referring to FIG. 10, the automated vehicle controller (120) controls the unmanned transfer device (100) to move along the rail (L) at a predetermined speed, and confirms whether the current position of the unmanned transfer device (100) is the preset wireless communication start position (ST10 and ST20).

In this case, the unmanned vehicle controller (120) is in a state of recognizing the current position, the stop position (current work position of the manufacturing facility), and the work environment setting time of the unmanned transfer device (100), and can set the wireless communication start position in consideration of the current moving speed, the current position, and the stop position of the unmanned transfer device (100).

Figure 11:
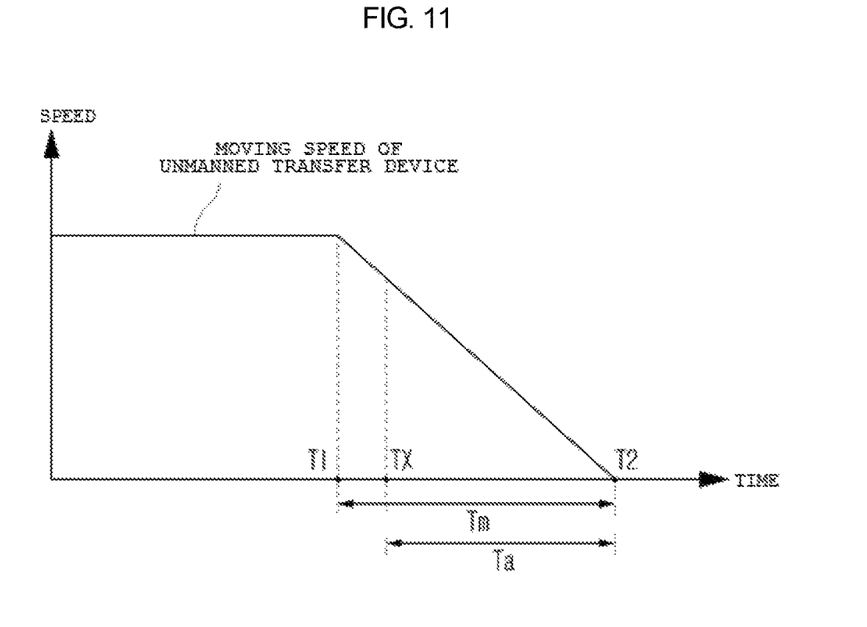
FIG. 11 is a diagram illustrating a method for setting a wireless communication start position in the deceleration section by means of the unmanned transfer device (100).

In other words, as illustrated in FIG. 11, the unmanned transfer device (100) is operated to stop at the work position of the manufacturing facility (200) while moving along the rail (L) at a predetermined speed, and moves along the rail (L) while decelerating at a predetermined speed to stop in the vicinity of the work position.

The unmanned transfer device (100) may control a deceleration start position (T1) and a deceleration speed of the unmanned transfer device such that a deceleration time (Tm) from the deceleration start position (T1) to the stop position (T2) in FIG. 11 is set lager than the work environment setting time (Ta in FIG. 8).

The wireless communication start position may be set to a position corresponding to a position (stop position—distance corresponding to work setting time) preceding as much as a distance corresponding to the RF communication time for setting work environment at the stop position of the unmanned transfer device.

In this case, the work setting time (Ta) may include an RF initialization setting time for the master communication unit (110), and the wireless communication start position may be set in consideration of the work setting time (Ta) including the RF initialization setting time for the master communication unit (110). In other words, the unmanned transfer device (100) determines a wireless communication start position to perform RF communication for setting RF initialization for the master communication unit (110) and setting work environment between the master communication unit (110) and the slave communication unit (210) until stopping at the work position of the manufacturing facility (200).

In addition, in setting the wireless communication start position, an identification means for recognizing a position of a sensor, a barcode, or the like is installed on a moving path such as the rail (L) of the unmanned transfer device (100) satisfying the matters described above, the unmanned vehicle controller (120) is separately provided with an identification information recognition means for acquiring identification information provided from such an identification means, and the position where the identification information is acquired may be set as the wireless communication start position.

In this case, the unmanned vehicle controller (120) adjusts moving distances of the unmanned transfer devices (100) such that only one unmanned transfer device (100) is positioned in the section of the rail (L) from the deceleration start position (T1) to the stop position (T2) or from the wireless communication start position to the stop position in FIG. 11, thereby excluding a case where two or more unmanned transfer devices (100) simultaneously access the slave communication unit (210).

As described above, when the unmanned vehicle controller (120) confirms the wireless communication start position, the unmanned vehicle controller (120) performs initialization necessary for an RF communication module of the master communication unit (110) by using a facility ID and channel.

Subsequently, the unmanned vehicle controller (120) provides the work environment setting information to the master communication unit (110), the master communication unit (110) converts the work environment setting information into a wireless data packet and transmits the wireless data packet to the slave communication unit (210) by wireless, and the slave communication unit (210) converts the work environment setting information provided from the facility controller (220) into a wireless data packet and transmits the wireless data packet to the master communication unit (110) by wireless, as a series of work environment setting operations (ST30).

The work environment setting information described above is signals of load port position (CS_0 and CS_1), VALID, carrier existence (U_REQ and L_REQ), TR_REQ, READY, and BUSY based on an E84 protocol, and these signals are sequentially turned on, thereby completing data communication related to the work environment setting (see FIG. 8).

When the work environment setting operation through RF communication between the master communication unit (110) and the slave communication (210) is completed while the unmanned transfer device (100) decelerates and moves in accordance with the control of the unmanned vehicle controller (120) and the unmanned transfer device (100) stops at the position of the manufacturing facility (200) to perform work (ST40), the unmanned vehicle controller (120) converts work control information related to loading and unloading into a wireless data packet through the master communication unit (110) and transmits the wireless data packet to the slave communication unit (210) by wireless, the slave communication unit (210) provides the work control information to the facility controller (220), converts response information related to loading and unloading work from the facility controller (220) into a wireless data packet, and transmits the wireless data packet to the master communication unit (110) by wireless, as a series of work control operations (ST50).

When the loading and unloading work is completed, the work control operations described above turns off BUSY in the unmanned transfer device (100) on the basis of the E84 protocol, and turns on a COMPT signal meaning completion of work.

In other words, the unmanned vehicle controller (120) sets BUSY off in accordance with the completion of work, sets COMPT on, and then controls the unmanned transfer device (100) to move along the rail (L) (ST60).

The unmanned vehicle controller (120) converts work environment release information into a wireless data packet through the master communication unit (110) in a state where the unmanned transfer device (100) moves, and transmits the wireless data packet to the slave communication unit (210) by wireless, and the slave communication unit (210) converts the work environment release information provided from the facility controller (220) into a wireless data packet, and transmits the wireless data packet to the master communication unit (110) by wireless, as a series of work environment release operations (ST70).

In other words, in the state where the unmanned transfer device (100) moves along the rail (L) after the completion of work, the master communication unit (110) and the slave communication unit (120) perform work environment release operations of setting a port selection signal, and VALID, READY, and COMPT signals off through wireless communication.

Meanwhile, by the method described above, in a case where the master transfer unit (110) of the unmanned transfer device (100) and the slave communication unit (210) of the manufacturing facility perform data communication, when there are the first and second unmanned transfer devices (110-1 and 100-2) moving while being positioned to be adjacent on the rail (L) as illustrated in FIG. 9, it is difficult to completely exclude occurrence of a case where the slave communication unit (210) performs wireless communication with the second unmanned transfer device (100-2) to perform the work environment setting operation.

According to the present invention, in consideration of the situation described above, when the second unmanned transfer device (100-2) completes the work environment setting operation while moving, the unmanned vehicle controller (110) determines whether the second unmanned transfer device (100-2) arrives at the stop position desired thereby within a predetermined time. When it is determined that the second unmanned transfer device (100-2) does not arrive at the stop position within the predetermined time after the completion of the work environment setting operation, the other unmanned transfer device, for example, the first unmanned transfer device (100-1) is recognized as working before the second unmanned transfer device (100-2), the wireless communication with the controller facility (200) is ended, the master communication device is switched to a standby state, and the currently set work environment setting information is cleared.

Thereafter, when the first unmanned transfer device (100-1) positioned ahead completes work and starts along the rail (L), the second unmanned transfer device (100-2) may re-perform the work environment setting operation while moving along the rail (L).

According to the present invention, the unmanned transfer device performs data communication with a manufacturing facility for setting work environment and releasing work environment while moving, so that it can reduce the transfer time on the unmanned transfer device, thereby improving the work efficiency thereof.

Also, the unmanned transfer device and the manufacturing facility perform data communication at a wireless communication start time point considering a moving speed of the unmanned transfer device and a time necessary for setting work environment, to minimize communication noise for the other unmanned transfer device therearound to secure stable work performance.

While the present invention has been described with respect to the specific embodiments, it will be apparent to those skilled in the art that various changes and modifications may be made without departing from the spirit and scope of the invention as defined in the following claims.

What is claimed is:

1. A data communication method for reducing a working time of an automated material handling system between a master communication device installed in an unmanned transfer device and a slave communication device installed in a manufacturing facility in the automated material handling system, the unmanned transfer device transferring a carrier between manufacturing facilities, the method comprising:
    a first step in which the master communication device and the slave communication device perform RF (Radio Frequency) communication while the unmanned transfer device moves towards a work position of a manufacturing facility with the RF communication being for setting a work environment at the manufacturing facility,
        wherein the first step is performed in a deceleration section where the unmanned transfer device decelerates to a stop at the work position of the manufacturing facility,
        wherein in the first step, the unmanned transfer device is configured to include
            a step of calculating the deceleration section based on the stop at the work position and a deceleration speed,
            a step of controlling the deceleration speed of the unmanned transfer device such that an RF communication time for setting the work environment is included in the deceleration section,
            a step of setting a position preceding as much as a distance corresponding to the RF communication time for setting the work environment at the stop at the work position of the unmanned transfer device, as a wireless communication start time point, and
            a step of performing the RF communication for setting the work environment at the wireless communication start time point;
    a second step in which the master communication device and the slave communication device convert work control information based on loading or unloading of the carrier into RF data, and transmit and receive the RF data to and from each other, while the unmanned transfer device stops at the work position of the manufacturing facility; and
    a third step in which the unmanned transfer device starts moving along a rail when the loading or unloading is completed in the manufacturing facility, and the master communication device and the slave communication device perform the RF communication for releasing the work environment and confirming results of the loading or unloading of the carrier.

2. The data communication method for reducing a working time of an automated material handling system according to claim 1,
    wherein an identification means provides a wireless communication start position around a moving path of the unmanned transfer device, and
    wherein in the first step, the unmanned transfer device recognizes the wireless communication start position based on acquisition of identification information from the identification means through an identification information recognition means, and provides the wireless communication start position to the master communication device, thereby performing the RF communication for setting the work environment between the master communication device and the slave communication device.

3. The data communication method of reducing a working time of an automated material handling system according to claim 1,
    wherein an identification means provides a wireless communication start position around a moving path of the unmanned transfer device, and
    wherein in the first step, the unmanned transfer device recognizes the wireless communication start position based on acquisition of identification information from the identification means through an identification information recognition means, and provides the wireless communication start position to the master communication device, thereby performing the RF communication for setting the work environment between the master communication device and the slave communication device.

4. The data communication method for reducing a working time of an automated material handling system according to claim 1,
    wherein in the first step, the unmanned transfer device is configured to include a step of RF-initializing the master communication device by using a facility ID and a channel of the manufacturing facility, and
    wherein the unmanned transfer device determines a wireless communication start position to perform the RF communication for setting the RF initialization for the master communication device and for setting the work environment between the master communication device and the slave communication device.

5. The data communication method for reducing a working time of an automated material handling system according to claim 2,
    wherein the unmanned transfer device is controlled to move such that only one unmanned transfer device is positioned in a moving section from the wireless communication start position to the stop at the work position.

6. The data communication method for reducing a working time of an automated material handling system according to claim 1,
    wherein the master communication device of the unmanned transfer discontinues performing the RF communication for setting the work environment of the first step with the slave communication device when the master communication device recognizes that another unmanned transfer device is working at the work position when the unmanned transfer device does not reach the stop at the work position within a predetermined time.

7. The data communication method for reducing a working time of an automated material handling system according to claim 6,
    wherein the unmanned transfer device resumes performing the first step when the work for the other unmanned transfer device completes working at the work position.

8. A data communication method for reducing a working time of an automated material handling system between a master communication device installed in an unmanned transfer device and a slave communication device installed in a manufacturing facility in the automated material handling system, the unmanned transfer device transferring a carrier between manufacturing facilities, the method comprising:

a first step in causing the unmanned transfer device to calculate divisions in the working time into
    a first time (Ta) based on distance to the manufacturing facility for communication between the unmanned transfer device and the manufacturing facility in setting a working environment, followed by
    a second time (Tb) based on the working time for the unmanned transfer device to stop at the manufacturing facility, and then followed by
    a third time (Tc) based on departure acceleration of the unmanned transfer device for communication between the unmanned transfer device and the manufacturing facility in releasing the work environment;

a second step in which the master communication device and the slave communication device perform RF (Radio Frequency) communication for setting the work environment while moving along a rail during the first time (Ta) before the unmanned transfer device comes to a stop at a work position of the manufacturing facility;

a third step in which the master communication device and the slave communication device convert work control information based on loading or unloading work for the carrier into RF data, and transmit and receive the RF data to and from each other during the second time (Tb) while the unmanned transfer device is at the stop at the work position of the manufacturing facility; and a fourth step in which the unmanned transfer device starts moving after the loading or unloading work is completed at the manufacturing facility, and the master communication device and the slave communication device perform RF communication for releasing the work environment during the third time (Tc).

\* \* \* \* \*